Sept. 8, 1964     A. R. BRILHART     3,147,660
DRUM-STICK
Filed April 11, 1961
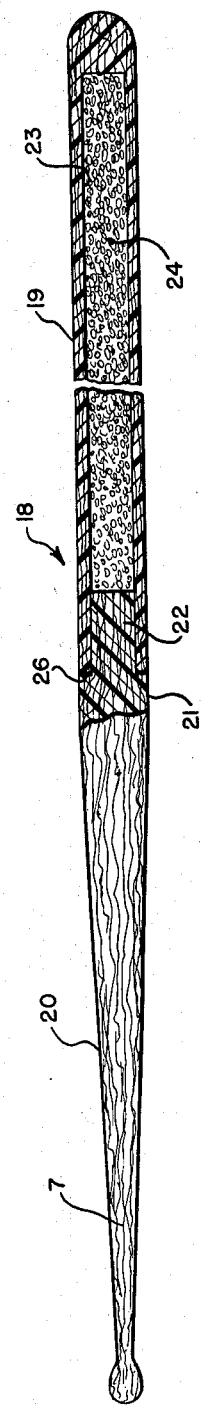
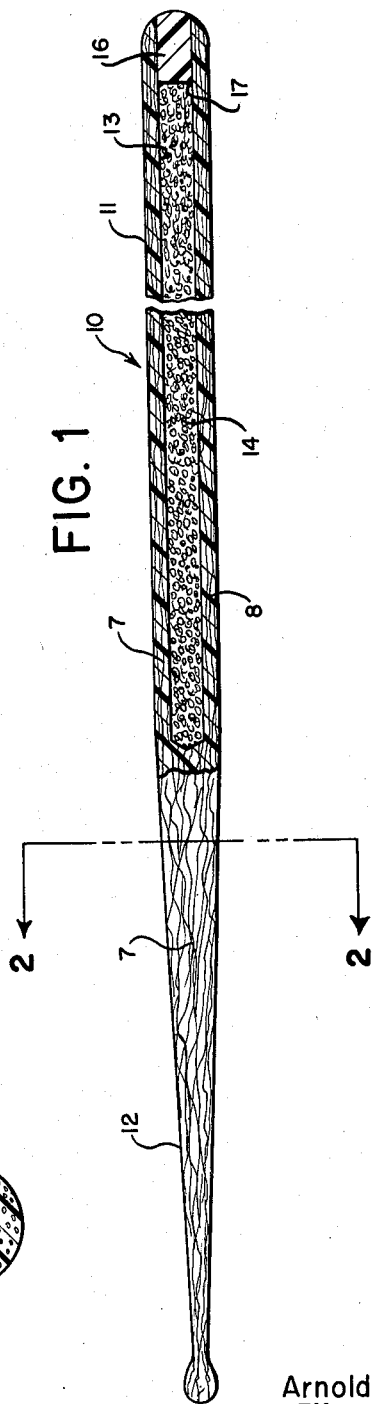
INVENTOR
Arnold R. Brilhart
BY
ATTORNEYS United States Patent Office 3,147,660
Patented Sept. 8, 1964

3,147,660
DRUM-STICK
Arnold R. Brilhart, Carlsbad, Calif., assignor to Brilhart Musical Instrument Corporation, Carlsbad, Calif., a corporation of New York
Filed Apr. 11, 1961, Ser. No. 102,291
3 Claims. (Cl. 84—422)

The present invention relates to drum-sticks of novel construction and to a method of fabricating the whole or portions of a drum-stick in a manner to simulate and substantially improve upon drum-sticks manufactured from natural woods.

The method of the present invention comprises combining and molding unidirectional fibers and resin by the application of heat and pressure, to produce drum-sticks having a simulated wood appearance. During the molding process, the relative concentration or proportion of fiber to resin may be controlled to produce predetermined characteristics of hardness, flexibility and appearance. Drum-sticks so produced are moisture and warp-resistant, which qualities are not generally shared by drum-sticks made of natural woods. The molded product may be formed as a finished drum-stick with substantially no machining operation required, or alternatively, blanks may be molded and later machined to a desired shape.

The invention further includes means for controlling the weight, balance and acoustical properties of drum-sticks produced according to the method herein disclosed. Tip and handle portions of the drum-sticks may be made interchangeable to suit the individual tastes of musicians, while reducing considerably the number of different models required to be produced by a manufacturer to satisfy the diverse needs of student drummers and of mature musicians.

These and other aspects of the invention will become apparent upon an examination of the following description relating to a particular embodiment or embodiments, and of the accompanying drawing in which:

FIG. 1 is a fragmentary cross-section view of a drum-stick, constructed according to the method of the present invention, which has integral tip and handle portions;

FIG. 2 is a cross-sectional view taken in the direction of the arrows 2—2 of FIG. 1; and FIG. 3 is a fragmentary cross-section view of drum-stick having interchangeable tip and handle portions.

FIGS. 1 and 2 of the drawing illustrate a drum-stick 10 which is formed of fiber and resin according to the method of the invention which will be described presently. In this particular embodiment, the fiber 7 consists of a unidirectional fiber such as sisal fiber, a plurality of such fibers being arranged longitudinally of the drum-stick and bound together with a phenolic resin binder 8. The drum-stick 10 has handle and tip portions 11, 12 respectively, conforming to conventional drum-stick design. The handle portion 11 has a bore 13 which is filled with a lightweight rigid acoustical foam material 14 such as polyurethane, or a foamed polystyrene, for example. A plug 16 rounded externally to match the adjacent contour of the handle portion is cemented at 17 and seals the bore 13.

The drum-stick 10 may initially be molded as a solid member in the shape of a drum-stick, or alternatively may be molded as a continuous rod, cut to size and then machined to the desired shape. Either of the foregoing procedures is within the contemplation of the present invention. However, the method which will now be described is more generally applicable to the formation of a molded drum-stick and has the advantage of producing a drum-stick molded to the correct shape.

In the particular embodiments of FIGS. 1–3, sisal fiber previously impregnated with a phenolic resin, is combined and molded with additional amounts of phenolic resin. The fiber and resin are subjected to heat and pressure in a mold. To produce a drum-stick of ½″ transverse cross-section, I use a mold which has a transverse loading chamber or cavity of approximately 5″ and a length of 20″, for each drum-stick. The bulk factor (compression ratio) of the combined resin-fiber is approximately 10:1. Of course, a plurality of molds may be charged to manufacture several drum-sticks simultaneously.

Each mold is heated to a temperature of approximately 325° F. before charging the mold with fiber and raw resin. In charging the mold, the fibers are selectively arranged longitudinally within the mold to control the distribution of fiber relative to the position of the fiber in the mold and to control the concentration of fiber relative to the raw resin binder. Generally speaking, a higher proportion of fiber to resin will result in greater flexibility and lighter weight of the drum-stick. The relative concentration of fiber to resin may selectively be varied in any given longitudinal segment along the length of a drum-stick, or may be made uniform throughout the entire length of the drum-stick, to produce desired flexibility and weight characteristics. The control of the ratio of fiber to resin also determines the relative hardness of the drum-stick and is also a factor in determining the texture and color of the finished product. A considerable range of colors is also possible by introducing pigments into the resin. By controlling these several factors, it is possible to produce drum-sticks having predetermined characteristics of flexibility and hardness which characteristics can be utilized to make drum-sticks of a quality superior to the old wooden drum-sticks. It is also possible to simulate closely the grained textures and colors of a variety of hardwoods.

When the mold cavity has been charged with the fiber and resin, the mold press is closed for about 5 minutes and the fiber and resin are subjected to a pressure of approximately 1,000 p.s.i. and a temperature of approximately 325° F. If, for example, a drum-stick has a thickness of ½″ and its length is 20″ the press must be capable of a total force of approximately 10,000 pounds for each drum-stick manufactured.

After subjecting the fiber and resin to heat and pressure for the proper interval, the press is opened and the newly molded drum-stick is removed, clamped in a straight V-block to prevent warping and permitted to cool. After cooling, the mold parting line fin is sanded, buffed or machined to desired smoothness. The entire drum-stick may then be buffed to a high polish.

To produce the drum-stick illustrated in FIG. 1, the handle portion 11 of the solid drum-stick is drilled out to a predetermined depth and diameter. The acoustical foam material 14 is packed in the resulting cavity and the plug 16 cemented in place. The depth and diameter of the bore 13 is a function of the weight reduction desired to simulate the density of a specific wood, for example. By appropriate drilling of the drum-stick, the balance and flexibility of the molded drum-stick may also be controlled. The use of acoustical foam in the interior of the handle provides a means for controlling the acoustical response of the drum-stick.

In the embodiment illustrated in FIG. 3, a drum-stick 18 has separable handle and tip portions 19, 20 respectively. Intermediate the handle portion 19 and tip portion 20 is a section 21 integral with the tip 20 which has been molded, or machined after molding, to present an annular reduced portion 22. The handle 19 is hollow, having been formed initially as a solid member and later drilled out to provide a bore 23. The handle 19 will be packed with a quantity of rigid acoustical foam material 24 for the purposes previously explained in connection with the embodiment of FIGS. 1 and 2. The bore 23 slidably receives the reduced portion 22 and the handle 19 may be cemented at 26 to the tip and intermediate portions of the drum-stick 20, 21.

The particular advantage of the arrangement illustrated in FIG. 3 is that the handle and tip portions may be made interchangeable with corresponding members of different weights, shapes and sizes. Consequently, for a given handle, the manufacturer may make a variety of tips which can be attached to handles and sold as completed items, or the parts may latter be interchanged by individuals wishing to experiment with different weights, sizes and shapes of handle and tip combinations. Although the method of attachment illustrated in FIG. 3 is to cement the handle to the tip and intermediate portions of the drum-stick, it is obvious that an equivalent means of attachment might be used, such as by threading the mating parts.

Additional advantages of the drum-sticks and of the novel method of manufacturing them are seen in the improved control which may be obtained of such critical drum-stick characteristics as flexibility, weight, balance, acoustical response, and hardness. Control of these factors will enable manufacturers of the new molded drum-sticks to produce a product superior in performance to conventional wooden drum-sticks due to the limitations inherent in the latter's composition and structure. In addition, drum-sticks may be manufactured to simulate closely the appearance of wooden drum-sticks and yet be warp and moisture resistant.

It will be understood that the foregoing description relates to a particular embodiment or embodiments and that changes may be made therefrom without departing from the teachings of the invention.

I claim:

1. A composition drum-stick comprising a plastic resin body having embedded therein a plurality of textile fibers, substantially all of said fibers being oriented length-wise of the body of the drum-stick.

2. A drum-stick according to claim 1 comprising composition sisal fiber and phenolic resin.

3. The drum-stick of claim 1, in which the drum-stick has handle and tip portions, the handle portion being hollow to receive a light-weight foam material having acoustical properties, means for sealing said foam material within the interior of said handle and means for maintaining the external surface of the drum-stick substantially continuous and unbroken.

References Cited in the file of this patent

UNITED STATES PATENTS

| | | |
|---|---|---|
| 1,121,189 | Lincoln | Dec. 15, 1914 |
| 1,484,777 | Hassenpflug | Feb. 26, 1924 |
| 2,521,336 | Bramson | Sept. 5, 1950 |
| 2,540,549 | Rotter | Feb. 6, 1951 |
| 2,572,772 | Skoog | Oct. 23, 1951 |
| 2,799,199 | Dane | July 16, 1597 |

OTHER REFERENCES

Music Trades Magazine, "New Plastic Drumsticks," July 1959, page 70.

Rogers, Inc. Catalog, "Weather King Drumsticks," page 62.